J. H. DAVIS.
DISK PLOW.
APPLICATION FILED JUNE 28, 1916.

1,256,984.

Patented Feb. 19, 1918.

WITNESS.

Floye M. Blanchard

INVENTOR.
John H. Davis
BY
ATTORNEY.

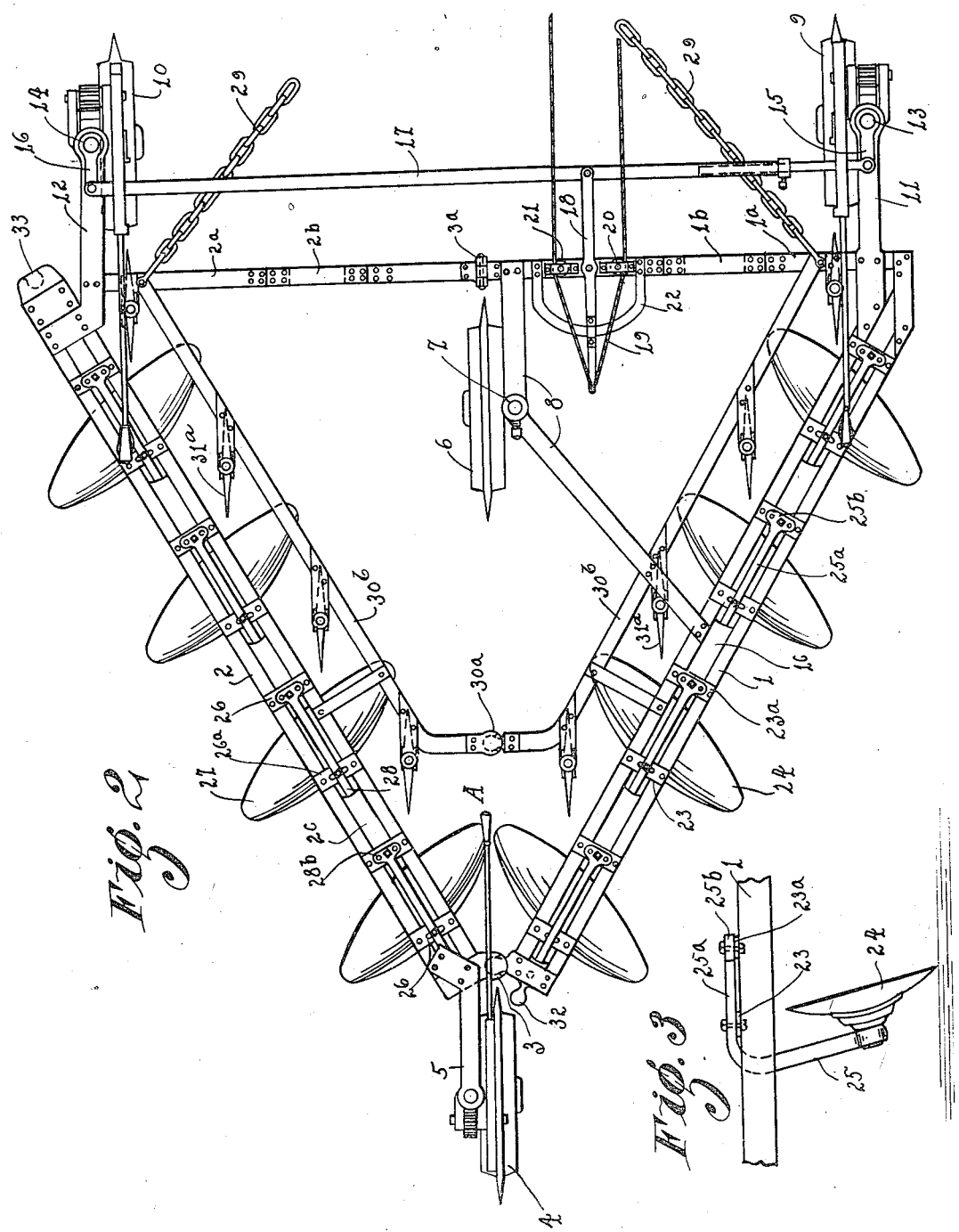

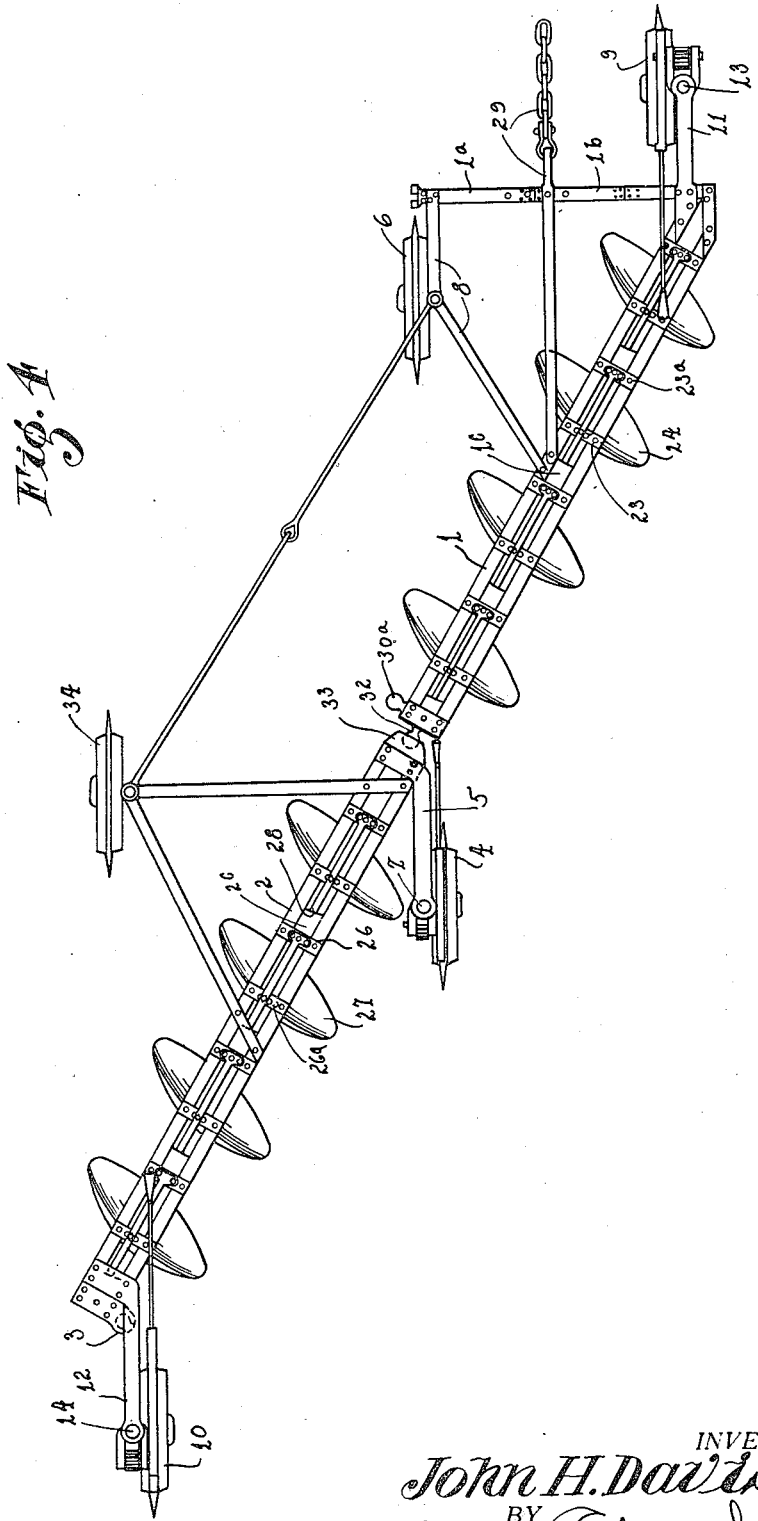

UNITED STATES PATENT OFFICE.

JOHN H. DAVIS, OF STOCKTON, CALIFORNIA.

DISK PLOW.

1,256,984.　　　　Specification of Letters Patent.　　Patented Feb. 19, 1918.

Application filed June 28, 1916. Serial No. 106,366.

*To all whom it may concern:*

Be it known that I, JOHN H. DAVIS, a citizen of the United States, residing at Stockton, in the county of San Joaquin, State of California, have invented certain new and useful Improvements in Disk Plows; and I do declare the following to be a full, clear, and exact description of the same, reference being had to the accompanying drawings, and to the characters of reference marked thereon, which form a part of this application.

This invention relates to improvements in disk plows, the object of the present invention being to provide a double disk plow so constructed and arranged that it can be used especially in connection with the plowing of vineyards and orchards. In the places last mentioned it is a common practice to plow the land twice, once away from the trees and once toward the trees. To do this with the now commonly used plows, it is necessary to first plow one side of the row and then the other and vice versa, and in so far as I am able to learn there has never been constructed and used a disk plow which could be adapted to double use.

I am aware that common plows have been designed for such uses but in practice they have been found heavy and cumbersome and of very little value. I consider however that a double disk plow properly constructed and operated can be very readily adapted to the work mentioned and I therefore design my present invention with that object in view.

In addition to the foregoing objects I also aim to construct the double disk plow so that the two plow frames which would be arranged side by side in the double disk plow may be disconnected from that position and hinged together in end to end relation so as to form a single gang plow which may be then used for various forms of plowing in vineyards, orchards, rice fields and similar places where gang plows may be needed.

A further object of the invention is to produce a simple and inexpensive device and yet one which will be exceedingly useful for the purposes for which it is designed.

These objects I accomplish by means of such structure and relative arrangement of the parts as will fully appear by a perusal of the following specification and claims.

In the drawings similar characters of reference indicate the corresponding parts in the several views.

Fig. 2 is a similar view showing it as arranged for turning the dirt from the center of the rows back toward the trees.

Fig. 3 is a detached view showing the disk supports.

Fig. 4 is a top plan view showing the appearance of the plow when the sections have been placed end to end to provide the gang plow as indicated above.

Figure 1:
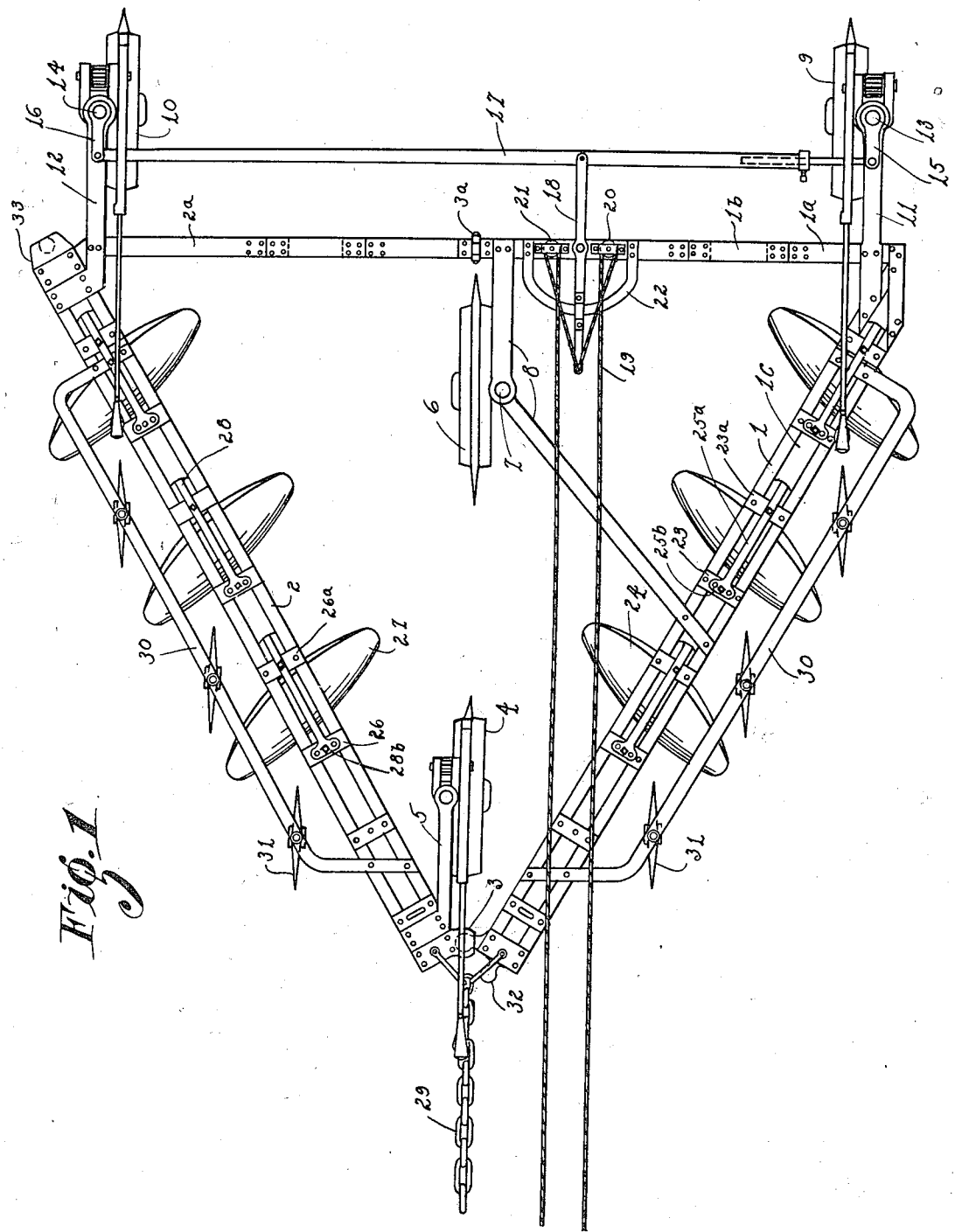
Fig. 1 is a top plan view showing the plow as it is arranged for turning the furrows toward the center of the rows.

Referring now more particularly to the characters of reference on the drawings, I first provide two disk supporting frames 1 and 2 hinged together at one end, as at 3, and extending obliquely from the point 3 in opposite directions with respect to each other. At the opposite ends of the frames 1 and 2 are provided inwardly projecting supports 1ᵃ and 2ᵃ which are hinged together, as at 3ᵃ, the hinge 3ᵃ being in substantially axial alinement with the hinge 3.

From the foregoing description it will be readily apparent that I have provided a double disk supporting frame hinged centrally, the purpose and function of which will appear as this specification progresses.

Assuming now that the plow was made up ready for use in plowing the dirt toward the center of the row, which would leave the parts positioned as shown in Fig. 1, and describing the invention as set forth in Fig. 1, I wish first to state that the draft on the plow will be directly in alinement with the center axis of the double frame so that the two members 1 and 2 which carry the disks (as will appear) will be drawn at an angle to the axis of the device so as to impart the necessary frictional engaging action against the disks to cause them to rotate.

In the structure as shown in Fig. 1 the front furrow wheel 4 is supported on a frame 5 bolted to one or the other of the frames 1 and 2. This frame 5 will be provided of course with raising and lowering and other adjustment means which are common in the art, hence no especial description of the same is here given.

The rear central furrow wheel 6 is mounted in a bearing 7 rigidly supported in projecting members 8 which may be projected either from the members 1 and 1ª or the members 2 and 2ª, as found most adaptable.

The rear side furrow wheels 9 and 10 are turnably mounted in supporting brackets 11 and 12 projecting from the members 1 and 2 respectively.

The yoke spindles 13 and 14 on the wheels 9 and 10 are provided with projecting arms 15 and 16 respectively connected by means of a cross bar 17. A lever 18 is pivoted to the cross bar 17 and to either of the frames 1ª and 2ª and is provided at its opposite end with a cable 19 projecting in opposite directions and extending under pulleys 20 and 21 and thence to the forward end of the machine. This cable 19 may be used to steer the wheels 9 and 10 in one direction or the other.

The lever 18 is guided over a quadrant 22 to keep it in proper position and rigid against vibration. The wheels 9 and 10 are provided with suitable raising and lowering attachments common in the art and not here described.

Each of the frames 1 and 2 comprise a pair of spaced bars of any suitable type forming the intermediate slots 1ᶜ and 2ᶜ. Across the bars of the frame 1 are secured cross bars 23 and 23ª one pair for each of the disks 24 which will be secured to the said frame 1. Each disk 24 is turnable on a support 25 which arches through the slot 1ᶜ and has a portion 25ª which extends horizontally above the frame 1 and is bolted first to the bar 23 and then to the bar 23ª. The outer end of the portion 25ª is provided with a cross head 25ᵇ provided with a plurality of holes whereby the angle of the disk 24 may be altered to vary its cutting depth. Secured to the member 2 are parts 26, 26ª, 27, 28, 28ª, and 28ᵇ corresponding to the parts 23 to 25ᵇ respectively.

In the structure shown in Fig. 1 the disks face the narrow end of the V-shaped frame and a drag chain 29 is connected with that end so that when drawn forward the disks revolve and cut the furrow and turn it toward the center of the device which in vineyards and orchards works the dirt away from the vines and trees which is the usual proceeding in the first spring plowing.

The furrow wheels 4 and 6, being centered axially of the entire device, cut through this center pile of dirt and practically divide it into two parts which is an advantage when the reverse operation of the plowing is had as will presently appear.

On each of the frames 1 and 2 is provided a side frame 30 which side frames carry a colter attachment 31 in front of each of the disks 24 with the usual functions attributed to colter attachments.

The hinged joints 3 and 3ª allow of the two sides of the device compensating for any unevenness of the ground surfaces. In all previous vineyard plows which have been attempted (and to my knowledge none of this special double disk type has ever been worked upon) the frames have been entirely rigid so that the plowing action is not perfect by any means, due to the fact that a great many uneven places will be encountered in which some of the plows will plow too deeply and the others not deep enough. By means of my hinged connection between the double disk frames however they may swing relative to each other so that as indicated above the unevenness in the ground surfaces will be compensated for and a more or less perfect, even plowing operation will be accomplished by the disks.

When the dirt has been plowed toward the center by the use of my plows as positioned in Fig. 1, and a second plowing is to be done by which plowing it is desired to throw the dirt from the center toward the trees and vines, this is accomplished by the use of the same parts described above but the same are reversed and are positioned as follows, namely:

The frame 5 is turned to extend behind the narrow point of the frame as shown in Fig. 2. The members 25—25ª and 28—28ª are removed from connection with the parts 23—23ª and 26—26ª and are reversed to face the disks in the opposite direction, that is, the parts 25ª and 28ª will be first bolted to the parts 23ª—26ª while their cross heads 25ᵇ and 28ᵇ will be fastened to the parts 23 and 26.

When the disks have been reversed from that position shown in Fig. 1 to that position shown in Fig. 2, this leaves a vacancy near the narrower end of the plow and hence I add another disk to each frame to fill in this vacancy which new disks come close together, as at a point "A". These last two disks will cut down the center of the pile of dirt which has been previously divided by the wheel 4.

The drag chains 29 will, in the form shown in Fig. 2, be connected at the wide end of the plow and will drag from that position so that the disks in their reversed position will then plow into the dirt and turn it from the center of the rows back toward the vines and trees. The disks adjacent the point "A", as indicated, will split the center pile evenly on both sides so that after the plow has passed through the row the dirt will be substantially leveled again.

When the disks are reversed this of course, necessitates reversing the colter attachment. To this end I substitute frames 30$^b$ for the frames 30. These frames 30$^b$ carry the colter wheels 31$^a$. I provide a ball and socket joint 30$^a$ for the free ends of the frames 30$^b$ so that the said frames 31$^b$ may move in conjunction with the hinges 3 and 3$^a$.

The frames 1$^a$ and 2$^a$ are provided with inserts 1$^b$ and 2$^b$ so that the width of the plow at the widest end may be varied according to the different widths or rows through which the plow may be worked. This narrowing of the wide end of the plow is permitted of by taking out these inserts 1$^b$ and 2$^b$ and moving the open ends together, this action being permitted of by reason of the ball and socket joint 3.

The above description indicates how my double disk plow may be converted for use for the double purposes indicated, namely, the throwing of the dirt in one direction and then in another. In addition to this the two parts of such double disk plow may be so converted as to string the disks out into a gang plow and this I accomplish by means of the following structure, namely:

On the end of the frame 1 is a ball 32 while on one end of the frame 2 is provided a corresponding socket 33. When the device is to be converted into a gang plow the frame 2 is dissociated from its position adjacent the side of the frame 1 and the ball 32 is inserted in the socket 33 and the wheel 10 is connected with the opposite end of the frame 2 and an additional furrow wheel 34 is mounted on the opposite end of the frame 2 in a manner similar to that in which the wheel 6 is mounted on the frame 1.

The draft, hitch or plow chain 29 is then connected with the forward end of the frame 1 in any desirable manner to advance the plow as a gang plow for the numerous purposes to which it may be adapted. The structure of this gang plow is shown in Fig. 4 and I have merely outlined the same to show how my double disk plow may be converted into a gang plow.

All of the forms of plows here shown would of course be provided with the various connections and attachments necessary to make them operate successfully but in view of the fact that all of these attachments would be well known in the art and would only confuse the drawings if added thereto I have not seen fit to especially illustrate or describe the same in this specification.

The frames or brackets 5 and 12 are of course, in practice, suitably constructed to allow of the reversal of the wheels 4 and 10 from the position shown in Fig. 1 to that shown in Fig. 2. This structure may be of any suitable form but preferably such that the said brackets 5 and 12 may be capable of disconnection from both the beams and wheel standards and reconnection therewith, in reversed or "up-side-down" position.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A convertible gang plow comprising a pair of beams, plowing devices carried by each beam and a coupling element at one end and side of each beam, whereby the beams are adapted to be connected either end to end or side by side.

2. A convertible disk plow comprising plow beams consisting of spaced bars forming an intermediate slot, bars extending across the slot in pairs, disk supporting bars, each bar being pivotally mounted on one member of one pair of said cross bars and fixed to the other member.

3. A convertible disk plow comprising plow beams consisting of spaced bars forming an intermediate slot, bars extending across the slot in pairs, disk supporting bars, each bar being pivotally mounted on one member of one pair of said cross bars and adjustably fixed to the other member.

4. A convertible disk plow comprising two plow beams hinged together at one end and extending in diagonally opposite directions, a projecting frame on the opposite end of each beam, such frames being hinged together, disk plows carried by the beams, and a colter attachment mounted in front of each disk.

5. A convertible disk plow comprising two connected supporting beams, a plurality of disks carried by the beams, such disks being reversible whereby when the plow is drawn in one direction the furrows will be turned toward the center of the plow and when drawn in the opposite direction the disks can be reversed to turn the furrows toward the outer edges of the plow, and a pair of furrow wheels carried centrally of the plow.

6. A convertible disk plow comprising two connected supporting beams, a plurality of disks carried by the beams, such disks being reversible whereby when the plow is drawn in one direction the furrows will be turned toward the center of the plow and when drawn in the opposite direction the disks can be reversed to turn the furrows toward the outer edges of the plow, a pair of furrow wheels carried centrally of the plow, one of said furrow wheels being constructed so that its position may be reversed when the disks are reversed.

7. A convertible disk plow comprising two disk carrying beams hinged side by side and suitably supported, a hinge member on one end of each beam, such hinges being adapted for connection with each other whereby the beams may be unhinged from their position side by side and hinged together in longitudinal alinement with each other.

In testimony whereof I affix my signature.

JOHN H. DAVIS.